(12) United States Patent
Hong et al.

(10) Patent No.: US 10,512,275 B2
(45) Date of Patent: *Dec. 24, 2019

(54) BAKED GOODS-LIKE TEXTURE WITHOUT BAKING

(71) Applicant: KRAFT FOODS GROUP BRANDS LLC, Northfield, IL (US)

(72) Inventors: Yeong-Ching Albert Hong, Kildeer, IL (US); Richard Leshik, Brookfield, CT (US); Zachary Caplan, Bronx, NY (US); Jimbay P. Loh, Green Oaks, IL (US)

(73) Assignee: KRAFT FOODS GROUP BRANDS LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/796,690

(22) Filed: Jul. 10, 2015

(65) Prior Publication Data

US 2015/0313254 A1 Nov. 5, 2015

Related U.S. Application Data

(60) Division of application No. 14/582,124, filed on Dec. 23, 2014, now Pat. No. 10,383,344, which is a continuation of application No. 13/416,648, filed on Mar. 9, 2012, now abandoned.

(60) Provisional application No. 61/451,936, filed on Mar. 11, 2011.

(51) Int. Cl.

| | |
|---|---|
| *A23G 3/50* | (2006.01) |
| *A23G 3/54* | (2006.01) |
| *A23G 1/40* | (2006.01) |
| *A23G 1/44* | (2006.01) |
| *A23G 1/54* | (2006.01) |
| *A23G 3/42* | (2006.01) |
| *A23G 3/44* | (2006.01) |
| *A23P 30/10* | (2016.01) |
| *A23L 29/20* | (2016.01) |
| *A23L 29/219* | (2016.01) |
| *A23L 29/281* | (2016.01) |
| *A23L 29/30* | (2016.01) |
| *A23L 7/157* | (2016.01) |
| *A23L 25/00* | (2016.01) |
| *A23L 35/00* | (2016.01) |

(52) U.S. Cl.
CPC ............... *A23G 3/50* (2013.01); *A23G 1/40* (2013.01); *A23G 1/44* (2013.01); *A23G 1/54* (2013.01); *A23G 3/42* (2013.01); *A23G 3/44* (2013.01); *A23G 3/54* (2013.01); *A23L 7/157* (2016.08); *A23L 25/00* (2016.08); *A23L 29/30* (2016.08); *A23L 29/20* (2016.08); *A23L 29/219* (2016.08); *A23L 29/281* (2016.08); *A23L 29/284* (2016.08); *A23L 29/35* (2016.08); *A23L 35/00* (2016.08); *A23P 30/10* (2016.08); *A23V 2002/00* (2013.01)

(58) Field of Classification Search
CPC .... A23G 3/50; A23G 3/54; A23G 1/54; A23L 1/05
See application file for complete search history.

(56) References Cited

U.S. PATENT DOCUMENTS

| | | | | |
|---|---|---|---|---|
| 3,342,612 | A | * 9/1967 | Foster | A23L 1/0532 426/431 |
| 3,393,074 | A | * 7/1968 | Ehrlich | A21D 13/80 426/523 |
| 4,401,685 | A | * 8/1983 | Brown | A23L 29/284 426/456 |
| 4,464,403 | A | 8/1984 | Leshik et al. | |
| 4,546,002 | A | 10/1985 | Leshik et al. | |
| 4,659,582 | A | 4/1987 | Puglia et al. | |
| 4,931,302 | A | 6/1990 | Leshik et al. | |
| 5,221,549 | A | 6/1993 | Leshik | |
| 5,238,699 | A | 8/1993 | King et al. | |
| 5,470,391 | A | * 11/1995 | Mallee | A23C 9/1504 127/38 |
| 6,117,473 | A | 9/2000 | Leshik et al. | |
| 6,372,272 | B2 | 4/2002 | Honoosic | |
| 6,596,335 | B1 | * 7/2003 | Lo | A23L 1/182 426/399 |
| 6,753,026 | B2 | 6/2004 | Kortum | |

(Continued)

FOREIGN PATENT DOCUMENTS

| | | |
|---|---|---|
| EP | 0530043 A1 | 3/1993 |
| JP | 9299016 A | 11/1997 |

(Continued)

OTHER PUBLICATIONS

Jason "How big is a grain of rice" Jun. 2006 https://uk.answers.yahoo.com/question/index?qid=20060814072348AAt9AfC, pp. 1-2.*

(Continued)

*Primary Examiner* — Kelly J Bekker
(74) *Attorney, Agent, or Firm* — Morgan, Lewis & Bockius LLP

(57) ABSTRACT

Compositions and methods for preparing a multi-texture, non-baked foodstuff having a first component with a first soluble solids ratio; and a second component with a second soluble solids ratio, wherein the second component is a non-baked foodstuff having at least 1% weight fraction of particulate matter having a particle size of about at least 100 μm, including at least one setting agent and at least one texture-modifying particulate ingredient and having a gel strength of about at least 100 and a liquid weight fraction of about at least 35%.

6 Claims, No Drawings

(56) References Cited

U.S. PATENT DOCUMENTS

| | | | |
|---|---|---|---|
| 6,903,320 B2 | 6/2005 | Cutler et al. | |
| 7,141,255 B2* | 11/2006 | Glassberg | A23C 9/1546 |
| | | | 426/112 |
| 7,264,835 B2 | 9/2007 | Funk | |
| 7,819,977 B2* | 10/2010 | Vanhoutte | C08B 30/12 |
| | | | 127/29 |
| 8,124,163 B2 | 2/2012 | Leshik et al. | |
| 2002/0014180 A1 | 2/2002 | De Coninck | |
| 2004/0137115 A1* | 7/2004 | Leshik | A23G 3/54 |
| | | | 426/103 |
| 2004/0142091 A1 | 7/2004 | Leshik et al. | |
| 2006/0193956 A1 | 8/2006 | Leshik et al. | |
| 2008/0026111 A1* | 1/2008 | Bellody, Jr. | A23G 1/32 |
| | | | 426/94 |
| 2008/0241335 A1* | 10/2008 | Rey | A23G 1/30 |
| | | | 426/575 |
| 2009/0035436 A1 | 2/2009 | Leshik et al. | |
| 2010/0159088 A1 | 6/2010 | Leshik et al. | |

FOREIGN PATENT DOCUMENTS

| | | |
|---|---|---|
| JP | 2000289732 A | 10/2000 |
| WO | 1996013978 A1 | 5/1996 |
| WO | 2014112484 A1 | 12/2004 |

OTHER PUBLICATIONS

AM Canada "Dessert and salad Couscous Recipes" Recipelink.com Jan. 2002 pp. 1-4 http://www.recipelink.com/msgboard_0/2002/JAN/59850.html.*

Kulp, Karl Handbook of Cereal Science and Technology, 2nd Edition Revised and Expanded CRC Press Mar. 2000 p. 25.*

USDA Basic Reports 09016, 20029, 09216 and 09206 pp. 1-8 https://ndb.nal.usda.gov/ndb/foods printed Jul. 11, 2016.*

Produce Converter http://www.howmuchisin.com/produce_converters/orange printed Jul. 11, 2016.*

Revsin, Leslie. The Secret Ingredient for Tender Cakes pp. 1-3 Sep. 2009 http://www.finecooking.com/articles/olive-oil-makes-cakes-tender.aspx.*

Better Homes and Gardens New Cookbook 12th Edition, 2004 Meredith Corporation p. 28.*

Corriher "The Elements of Chocolate" pp. 1-3 2007 http://acselennentsofchocolate.typepad.com/elements_of_chocolate/ACSBrownieChronicles.html (Year: 2007).*

Wikipedia, "Agglomerated food powder" pp. 1-4 printed Aug. 2018 (Year: 2018).*

Mallinckrodt Chemicals Material Safety Data Sheet "Gelatin" pp. 1-5 Sep. 2009 https://www.elac.edu/academics/departments/chemistry/chemistrydocuments/docs/G/gelatin.pdf.*

PubChem "Sodium Alginate" pp. 1-7 printed Nov. 2018 https://pubchem.ncbi.nlm.nih.gov/compound/5102882#section=Top.*

Roussell, Mike "Whey Protein Isolate vs. Whey Protein Concentrate" Nov. 2009 pp. 1-13 http://mikeroussell.com/whey-protein-isolate-vs-whey-protein-concentrate/.*

Produce Converter http://www.howmuchisin.com/produce_converters/orange printed Jul. 11, 2016 p. 1.*

Ofite, "Static Gel Strength Measurement Device", http://www.ofite.com/instructions/120-53.pdf p. 7, 2014.

Fennema et al., "Food Chemistry", 4th Edition, CRC Press 2008, p. 284.

Bittman, "How to Cook Everything", Wiley Publishing 1998 pp. 662 and 663.

FDA, Water Activity in Foods, pp. 1-4, http://www.fda.gov/ICECI/Inspections/InspectionGuides/InspectionTechnicalGuides/ucm072916.htm Apr. 1984.

USDA Water Activity in Food, pp. 1-2 http://pmp.arserrc.gov/PMPOnline/References/WaterActivity.aspx Aug. 1995.

* cited by examiner

BAKED GOODS-LIKE TEXTURE WITHOUT BAKING

CROSS-REFERENCE TO RELATED APPLICATIONS

The present application is a division of currently pending U.S. patent application Ser. No. 14/582,124 filed Dec. 23, 2014, which is a continuation of U.S. patent application Ser. No. 13/416,648 filed Mar. 9, 2012, which in turn claims benefit of priority from U.S. Provisional Patent Application No. 61/451,936, filed Mar. 11, 2011, each of which are incorporated by reference herein in their entirety.

BACKGROUND OF THE INVENTION

The present invention generally relates to food technology, and more particularly, to non-baked foodstuffs having a desirable texture, such as the texture of a baked good, and methods of manufacturing the same.

BRIEF SUMMARY OF THE INVENTION

Disclosed herein is a method for preparing a non-baked foodstuff, comprising preparing a fluid composition comprising at least one setting agent and at least one texture-modifying particulate ingredient; heating the fluid composition at a temperature and time sufficient for pasteurization; and allowing the fluid composition to cool to form a non-baked foodstuff having at least 1% weight fraction of particulate matter having a particle size of about at least 100 μm and a gel strength of about at least 100. Also disclosed herein is a non-baked foodstuff having at least 1% weight fraction of particulate matter having a particle size of about at least 100 μm, comprising at least one setting agent and at least one texture-modifying particulate ingredient and having a gel strength of greater than 100.

In an embodiment, the method includes an aeration step. In another embodiment, the method includes an ultra high temperature (UHT) step.

In an embodiment, the fluid composition has a viscosity of about less than 100,000 cps before setting.

In an embodiment, the non-baked foodstuff has at least 5% weight fraction of particulate matter having a particle size of about at least 100 μm.

In an embodiment, the cooled foodstuff has a water activity of about at least 0.55 and a liquid weight fraction of about at least 35%.

In an embodiment, the cooled foodstuff has about less than 5% evaporation during and/or after processing.

In an embodiment, the cooled foodstuff has a texture selected from the group consisting of a fudge texture, a cake texture and a brownie texture.

In an embodiment, the particulate ingredient is selected from the group consisting of cereal-based crumbs, flakes, pieces, or combinations thereof, wherein the non-baked foodstuff contains at least 1% weight fraction of particulate matter having a particle size of 100 μm or greater after processing or in the final product. In another embodiment, the particulate ingredient is selected from the group consisting of grain-based crumbs, flakes, pieces, or combinations thereof, wherein the non-baked foodstuff contains at least 1% weight fraction of particulate matter having a particle size of about at least 100 μm after processing or in the final product. In an aspect of one embodiment, the particulate ingredient is an agglomerated substance, wherein the non-baked foodstuff contains at least 1% weight fraction of particulate matter having a particle size of about at least 100 μm after processing and/or in the final product. The aglomerated substances may be or may include substances that are selected from the group consisting of flour, starch, fibers, hydratable food materials, compressible food materials, and combinations thereof.

In an embodiment, the fluid composition further comprises at least one additional functional ingredient selected from the group consisting of emulsifiers, stabilizers, thickeners, foaming agents, nutrients, colors, and flavorings.

In an embodiment, the setting agent is selected from the group consisting of a thermal setting agent, a chemical setting agent, and an agent which is both thermal- and chemical-setting. In an aspect, the setting agent is selected from the group consisting of a thermal setting hydrocolloid, a thermal setting lipid, a chemical setting hydrocolloid, and a chemical setting protein, and any combination thereof.

Also disclosed herein is a method for preparing a multi-texture, non-baked foodstuff including preparing a first component with a first soluble solids ratio; preparing a second component with a second soluble solids ratio, wherein the second component is a non-baked foodstuff having at least 1% weight fraction of particulate matter having a particle size of about at least 100 μm, comprising at least one setting agent and at least one texture-modifying particulate ingredient and having a gel strength of about at least 100 and a liquid weight fraction of about at least 35%. In an embodiment, the first and second components are combined to form the multi-texture, non-baked foodstuff. In an embodiment, the first and second soluble solid ratios have a relative difference of about 12 percent or less.

Also disclosed herein is a multi-texture, non-baked foodstuff including a first component with a first soluble solids ratio; and a second component with a second soluble solids ratio, wherein the second component is a non-baked foodstuff having at least 1% weight fraction of particulate matter having a particle size of about at least 100 μm, comprising at least one setting agent and at least one texture-modifying particulate ingredient and having a gel strength of about at least 100 and a liquid weight fraction of about at least 35%; wherein the first and second components are arranged in discrete layers to form the multi-texture, non-baked foodstuff and wherein the first and second soluble solid ratios have a relative difference of about 12 percent or less.

DETAILED DESCRIPTION OF THE INVENTION

One embodiment of the present invention provides, in part, non-baked foodstuffs having a baked goods-like texture without the need for baking the foodstuff, as well as methods of making such foodstuffs without baking.

In one embodiment there is a water-containing, heat processable, fluid composition including one or more setting agents and one or more texture-modifying particulate ingredients. An exemplary non-baked foodstuff is prepared from a blend of water, at least one setting agent, and at least one texture-modifying agent. Sweeteners and/or flavorings may be added to provide the desired level of sweetness or desired flavor profile. Additional functional ingredients may be added as desired, including emulsifiers, stabilizers, thickeners, foaming agents, nutrients, colors, and the like. Processing steps may include one or more of mixing, homogenization, heating, filling, layering and cooling of a non-baked foodstuff. It will be understood that the order of such steps may be modified as necessary to prepare a desired product.

In one embodiment, a fluid composition is placed into a suitable container for the cooling and/or setting steps.

In another embodiment, a method of preparing a non-baked foodstuff is provided, wherein a water-containing, heat processable, fluid composition, including one or more setting agents and one or more texture-modifying particulate ingredients, is prepared, processed, and subsequently allowed to set to prepare the final non-baked foodstuff product.

In one embodiment, the fluid composition has a viscosity of about less than 100,000 cps. In another embodiment, a fluid composition has a viscosity of about less than 75,000 cps. In one embodiment, the fluid composition has a viscosity of less than 100,000 cps. In another embodiment, a fluid composition has a viscosity of less than 75,000 cps.

The liquid fraction of a non-baked foodstuff comprises one or more of water, liquid polyols, and non-lipid ingredients which are fluid at the processing temperature, as well as any combination thereof. In an embodiment, the liquid fraction does not include any lipid ingredients. In an embodiment, the liquid fraction includes lipid ingredients. Examples of liquid polyols include, but are not limited to, glycerol, propylene glycol, polyethylene glycols, and the like, as well as suitable humectants. In an embodiment, a liquid fraction comprises water and at least one liquid polyol. In another embodiment, a liquid fraction comprises water. In another embodiment, a liquid fraction is substantially entirely water. In an embodiment, an exemplary non-baked foodstuff has a liquid weight fraction of at least 15%, at least 20%, at least 25%, at least 30%, at least 35%, at least 40%, at least 45%, at least 50%, at least 55%, at least 60%, at least 65%, at least 70%, or at least 75%. In another embodiment an exemplary non-baked foodstuff has a liquid weight fraction of about at least 15%, about at least 20%, about at least 25%, about at least 30%, about at least 35%, about at least 40%, about at least 45%, about at least 50%, about at least 55%, about at least 60%, about at least 65%, about at least 70%, or about at least 75%. In one embodiment, a non-baked foodstuff has a liquid weight fraction of about 35% to about 80%, about 35% to about 75%, about 35% to about 70%, about 35% to about 60%, about 40% to about 75%, about 40% to about 70%, or about 40% to about 60%.

In one embodiment, there is about 5% or less evaporation of water from an exemplary non-baked foodstuff during processing and/or after processing. Preferably, a non-baked foodstuff has substantially no evaporation during processing and/or after processing. In an aspect, the final liquid weight fraction of a non-baked foodstuff is about the same as the total amount of water added during processing. In another embodiment, a non-baked foodstuff has about 0.5% evaporation or less, about 1% evaporation or less, about 2% evaporation or less, about 3% evaporation or less, about 4% evaporation or less, about 5% evaporation or less, about 6% evaporation or less, about 7% evaporation or less, about 8% evaporation or less, about 9% evaporation or less, or about 10% evaporation or less during and after processing.

In an embodiment, an exemplary non-baked foodstuff has a water activity of greater than 0.55 or greater than about 0.55. In another embodiment, a non-baked foodstuff has a water activity of greater than about 0.8 or great than 0.8. The water activity (Aw) is defined as follows: Aw=P/Po, wherein P is the partial pressure of water in the food product at temperature T, and Po is the saturated water pressure of pure water at the given temperature T. In an embodiment, an exemplary non-baked foodstuff has a water activity of greater than about 0.6, greater than about 0.65, greater than about 0.7, greater than about 0.75, greater than about 0.8, greater than about 0.85, greater than about 0.9, greater than about 0.95, or up to about 1.0. In an embodiment, an exemplary non-baked foodstuff has a water activity of greater than 0.6, greater than 0.65, greater than 0.7, greater than 0.75, greater than 0.8, greater than 0.85, greater than 0.9, greater than 0.95, or up to 1.0. In an embodiment, the ratio of water, humectants and soluble solids will affect the water activity in the finished (i.e., set) product.

A non-baked foodstuff of one embodiment has a gel strength of about at least 100. In another embodiment, a non-baked foodstuff has a gel strength of about at least 150, about at least 200, about at least 250, about at least 300, about at least 350, about at least 400, about at least 450, about at least 500, about at least 600, about at least 700, about at least 800, about at least 900, about at least 1000, about at least 1250, about at least 1500, about at least 1750, or about at least 2000. In another embodiment, a non-baked foodstuff has a gel strength of about at least 2500. In another embodiment, a non-baked foodstuff has a gel strength of at least 100, at least 150, at least 200, at least 250, at least 300, at least 350, at least 400, at least 450, at least 500, at least 600, at least 700, at least 800, at least 900, at least 1000, at least 1250, at least 1500, at least 1750, or at least 2000. In another embodiment, a non-baked foodstuff has a gel strength of at least 2500. In another embodiment, a non-baked foodstuff has a gel strength of about 100, about 150, about 200, about 250, about 300, about 350, about 400, about 450, about 500, about 600, about 700, about 800, about 900, about 1000, about 1250, about 1500, about 1750, or about 2000. In another embodiment, a non-baked foodstuff has a gel strength of about 2500.

Gel strength is a measure of the retention of a gel form, based on the gel's resistance to shear. Gel strength is measured by determining the ability of a non-baked foodstuff as set forth herein to resist the pressure of a physical probe applied to the surface of the foodstuff. Gel strength of a non-baked foodstuff is measured using a texture analyzer (e.g., Texture Technologies Corporation, TA-XT2 unit) with a one-half inch diameter round ball probe in a compression test of 6.0 mm, at the speed of 1.0 mm per second, on the sample of interest, in a cylindrical container having dimensions of approximately three inches in diameter and three inches in height. As will be understood by one of skill in the art, the size and shape of the container holding the sample may affect the results of the compression test. In an embodiment, the cylindrical container is comprised of plastic. In an embodiment, the gel strength is measured on a homogeneous sample of interest. In an embodiment, the gel strength is measured on a sample of interest comprising only one layer. In another embodiment, gel strength is measured on a sample of interest comprising two or more layers. In one embodiment, the two or more layers are of identical gel strength. In another embodiment, the two or more layers are of similar gel strengths. In another embodiment, the two or more layers are of different gel strengths. It will be understood that gel strength may be measured in other ways, using other methods, and that comparisons made of two or more samples must be controlled for the method of testing used in order to make the comparisons meaningful. For example, it will be understood that the gel strength of a single-layer product may be different than a two-layer product, even if the products have identical top layers.

In one embodiment, the non-baked foodstuff comprises one or more setting agents. Such setting agents may include, but are not limited to, thermal setting agents, chemical setting agents, and agents which are both thermal- and chemical-setting. In one embodiment, a thermal setting agent is thermal setting hydrocolloid, a thermal setting lipid, or a combination thereof. In another embodiment, a chemical setting agent is a chemical setting hydrocolloid, a chemical setting protein, or a combination thereof.

In one embodiment, the non-baked foodstuff comprises one or more texture modifying agents. In an embodiment, a texture modifying agent is a particulate ingredient. Particulate ingredients may include, but are not limited to, cereal-based crumbs, flakes, pieces, or other particulates, or combinations thereof. Particulate ingredients also include grain-based crumbs, flakes, pieces, or other particulates, or combinations thereof. Non-limiting examples of particulate ingredients include, but are not limited to, breadcrumbs, shredded wheat, shredded rice, and rice crisps. In an aspect, particulate ingredients may be made from one or more of flour, grain, leavening agents, salts, and other additives known in the art to comprise such particulates. In one embodiment, a texture modifying agent may be baked, cooked or otherwise processed before addition of the texture modifying agent to the mixture containing the ingredients for the non-baked foodstuff. That is, a texture modifying agent may be baked, cooked, extruded or otherwise processed before addition to the mixture that is subject to further processing that does not include baking, such as mixing, homogenization, heating, filling, layering and cooling of a non-baked foodstuff into a suitable container.

Particle size is measured by dissolving and melting gelling agent(s) in hot water solution without damaging the particles, passing the dissolved and melted mixture containing the particulate material through a sieve of known size and analyzing the particles retained on the sieve. Particle size is also measured by dissolving and melting gelling agent(s) in hot water solution without damaging the particles, passing the dissolved and melted mixture containing the particulate material through multiple sieves of known sizes and comparing the particles retained on each sieve. The particulate fraction retained on each sieve can then be blot dried and weighed in order to calculate the particle size fraction for the foodstuff. The measurements are performed on hydrated, blot-dried particles. Some exemplary non-baked foodstuffs, when containing particulate texture modifying agents, include about at least 1% weight fraction of particulate ingredients, at least 1% weight fraction of particulate ingredients, about at least 5% weight fraction of particulate ingredients, and preferably, at least 5% weight fraction of particulate ingredients. The weight fraction is determined by determining the percentage of weight of particulate matter as compared to the total weight of the foodstuff sample of interest prior to processing for particle size determination. In an embodiment, one layer of US#18 sieve on top and one layer of US#140 sieve at the bottom are used to facilitate the separation process. The weight fractions for each layer is then added together to give the final weight fraction. In an embodiment, an exemplary non-baked foodstuff containing particulate texture modifying agents includes about at least 0.1%, about at least 0.5%, about at least 1%, about at least 2%, about at least 3%, about at least 4%, about at least 5%, about at least 6%, about at least 7%, about at least 8%, about at least 9%, about at least 10%, about at least 15%, about at least 20%, about at least 25%, about at least 30%, about at least 40%, or about at least 50% weight fraction of particulate texture modifying agents. In another embodiment, a foodstuff includes greater than 50% weight fraction of particulate texture modifying agents. In another embodiment, an exemplary non-baked foodstuff containing particulate texture modifying agents includes at least 0.1%, at least 0.5%, at least 1%, at least 2%, at least 3%, at least 4%, at least 5%, at least 6%, at least 7%, at least 8%, at least 9%, at least 10%, at least 15%, at least 20%, at least 25%, at least 30%, at least 40%, or at least 50% weight fraction of particulate texture modifying agents. In another embodiment, an exemplary non-baked foodstuff containing particulate texture modifying agents includes about 0.1%, about 0.5%, about 1%, about 2%, about 3%, about 4%, about 5%, about 6%, about 7%, about 8%, about 9%, about 10%, about 15%, about 20%, about 25%, about 30%, about 40%, or about 50% weight fraction of particulate texture modifying agents.

In an embodiment, an exemplary foodstuff contains about less than 55% weight fraction of particulate texture modifying agents. In another embodiment, a foodstuff contains about less than 50%, about less than 45%, about less than 40%, about less than 35%, about less than 30%, about less than 25%, about less than 20%, about less than 15%, about less than 10%, about less than 9%, about less than 8%, about less than 7%, about less than 6%, about less than 5%, about less than 4%, about less than 3%, about less than 2%, or about less than 1% weight fraction of particulate texture modifying agents. In another embodiment, a foodstuff contains less than 55%, less than 50%, less than 45%, less than 40%, less than 35%, less than 30%, less than 25%, less than 20%, less than 15%, less than 10%, less than 9%, less than 8%, less than 7%, less than 6%, less than 5%, less than 4%, less than 3%, less than 2%, or less than 1% weight fraction of particulate texture modifying agents.

In an embodiment, a foodstuff contains about less than 25% particulate texture modifying agents and about at least 1% particulate texture modifying agents.

In one embodiment, particulate texture modifying agents are selected based on their properties of agglomeration. In one embodiment, particulate texture modifying agents used in the preparation of a non-baked foodstuff comprise particulate ingredients which agglomerate, wherein such particulate ingredients persist in the agglomerated state throughout processing steps. In an embodiment, agglomeration can be achieved by compressing, extrusion, compacting, or other suitable means of processing, or any combination thereof. In an embodiment, the particulate ingredients maintain at least 90% of the agglomeration from start to finish of the process of preparing the non-baked foodstuff.

In another embodiment, particulate texture modifying agents are selected based on their properties of hydration. In one embodiment, the particulate ingredients are able to be hydrated. In another embodiment, the particulate ingredients are hydrated before adding to the formulation. As will be understood by the skilled artisan, particulate ingredients of different structure and composition will be hydratable to varying degrees. The ability of a particulate ingredient to be hydrated may contribute to the ease with which the particulate ingredients may be pasteurized or sterilized.

In an embodiment, an exemplary non-baked foodstuff is aerated prior to setting. Aeration of the foodstuff may be used to enhance the final texture of the non-baked foodstuff. In one embodiment, aeration provides a distinct and/or an enhanced baked-goods like texture. In one embodiment, a method of making a non-baked foodstuff includes aeration of the fluid mixture after heating but prior to filling the final container in which the product will be stored or sold. In an embodiment, one or more homogenization steps precede any aeration steps.

In an embodiment, the fat used in the non-baked foodstuff may be, for example, canola oil, cocoa butter, coconut oil, copra oil, corn oil, cotton oil, olive oil, palm oil, palm kernel oil, peanut oil, safflower oil, soybean oil, sunflower oil, and the like, or combinations thereof. In an embodiment, the fats may be animal fats. In another embodiment, the fat may be chemically modified (e.g., hydrogenated or interesterified). In one embodiment, a non-baked foodstuff comprises about 40 percent water or greater, and about 5% to about 40% percent fat. By preparing a water and fat emulsion using these ingredients, one can create a non-baked foodstuff having a baked goods-like texture, but also having a relatively high water content and a high water activity.

The foodstuff can be heat pasteurized or sterilized under ultra-high temperature (UHT) conditions and is useful as a ready-to-eat foodstuff either alone or in combination with other foodstuff components (e.g., pudding, mousse, ready-to-eat fudge, and the like). Typically UHT treatment may be carried out under conditions of high temperatures and short time periods (e.g., about 280° F. for about 15 seconds) in order to kill potentially dangerous microorganisms. Other temperature and time profiles normally used for pasteurization and/or sterilization can also be used so long as they provide the desired treatment of the ingredients or foodstuff.

To provide a non-baked foodstuff, especially when combined with other components such as pudding, mousse, and the like, the foodstuff set forth herein preferably has a long shelf-life. To achieve a non-baked foodstuff having a long shelf-life, the non-baked foodstuff in one embodiment may be pasteurized or sterilized at ultra-high temperatures. In another embodiment, the non-baked foodstuff can additionally be prepared using aseptic techniques. In an embodiment, the UHT processed non-baked foodstuff has a shelf life of greater than about 6 months at ambient temperatures for aseptically packaged products and greater than about 3 months under refrigerated conditions for non-aseptically packaged products. In one embodiment, the shelf life is at least 30 days. In another embodiment, the shelf life is at least 60 days. In yet another embodiment, the shelf life is at least 90 days. In one embodiment, the non-baked foodstuff can be stored at room temperature. In another aspect, the non-baked foodstuff can be stored under refrigeration.

A non-baked foodstuff of one embodiment may or may not contain emulsifiers. In an embodiment, the foodstuff comprises one or more emulsifiers. In an embodiment, one or more fats are emulsified. A non-baked foodstuff of one embodiment may or may not contain lecithin. In one embodiment, a non-baked foodstuff comprises 0.1% to 3% lecithin. In one embodiment, a non-baked foodstuff does not contain lecithin, and the resulting non-baked foodstuff cools and sets to provide a resultant foodstuff of desired composition and texture, and in an aspect, a texture and composition as described herein. This is in contrast to the previous understanding in the art that lecithin was required to provide certain desired final foodstuff textures. In another embodiment, a non-baked foodstuff contains substantially no lecithin, and the resulting non-baked foodstuff cools and sets to provide a resultant foodstuff of desired composition and texture, and in an aspect, a texture and composition as described herein. In still another embodiment, a non-baked foodstuff contain no added lecithin, and the resulting non-baked foodstuff cools and sets to provide a resultant foodstuff of desired composition and texture, and in an aspect, a texture and composition as described herein.

A non-baked foodstuff may comprise a single layer. In another embodiment, a non-baked foodstuff may comprise two or more layers. In one embodiment, when multiple layers are present, one or more layers may comprise the same non-baked foodstuff. In another embodiment, when multiple layers are present, various layers may be comprised of two or more different non-baked foodstuff products. In yet another embodiment, when multiple layers are present, one or more layers may be comprised of a non-baked foodstuff, and one or more layers may be comprised of a foodstuff other than a non-baked foodstuff. As used herein, "layers" or "discrete layers" is intended to include separate layers of the different components as well as inclusions of one component in a layer of the other component. Examples of components include puddings, gels, mousses, custards, flans, yogurts, fudges, whipped toppings, chocolates, chocolate chips or bits, jellies, sauces, cookies or pieces thereof, cookie dough, fruits, nuts and the like whether imitation or real. Generally, components formed from candies, chocolate chips or bits, cookie dough, and/or fruits are in the form of inclusions.

When two different layers, or a layer and an inclusion, contact one another, substantial changes in texture and/or color may occur over time if the textures and/or colors are appreciably different. Texture stability between the layers, or between a layer and an inclusion can be achieved by matching the soluble solids ratio between the different components. Within each component (e.g., layer, inclusion), the soluble solids ratio is defined as the total weight of soluble solids in the layer, divided by the sum of the weight of water and weight of soluble solids in that layer, as shown in the following formula: Soluble Solids Ratio=(Soluble Solids/(Water+Soluble Solids))*100.

Two or more layers or components are considered to have "matched" soluble solids ratios when the soluble solids ratio of adjacent components are within about 12 percent of each other. In another embodiment, two or more layers or components are considered to have "matched" soluble solids ratios when the soluble solids ratio of adjacent components are within about 6 percent of one another. In another embodiment, two or more layers or components are considered to have "matched" soluble solids ratios when the soluble solids ratio of adjacent components are within about 1 percent of one another. In determining the difference in soluble solid ratios between two adjacent components, it is the relative difference rather than the absolute difference which is used. Thus, by way of a non-limiting example, two adjacent layers having soluble solid ratios of 22.4 percent and 23.7 percent, respectively, have a relative difference of about 5.8 percent (as opposed to the absolute difference of 1.3 percent between the two layers). It will also be understood that two or more layers or components are considered to have "matched" soluble solids ratios when the soluble solids ratio of adjacent components are within about 18 percent of one another, within about 15 percent of one another, within about 12 percent of one another, within about 9 percent of one another, within about 6 percent of one another, within about 3 percent of one another, within about 1 percent of one another, or within about less than 1 percent of one another.

In one embodiment, a method for preparing a non-baked foodstuff includes preparing a first component with a first soluble solids ratio, preparing a second component with a second soluble solids ratio, the second component being a non-baked foodstuff as described herein, and combining the first and second components. The soluble solids ratios of such a product may preferably have a relative difference of about less than twelve percent, as described herein.

Taking into consideration the compositions and methods exemplified herein, it will be understood that depending upon the desired product and process, optional ingredients may be used. Examples of optional ingredients include high-intensity sweeteners, such as stevia, saccharin, sucralose, aspartame, and acesulfame, and sweeteners such as fructose, glucose, dextrose, corn syrup, corn syrup solids, honey, and the like.

In an exemplary embodiment, a non-baked foodstuff includes at least one setting agent and at least 5% weight fraction of particulate matter having a particle size of about at least 100 μm, and has a gel strength of greater than 100 and a liquid weight fraction of about at least 35%. In another exemplary embodiment, a method for preparing a non-baked foodstuff comprises preparing a fluid composition comprising at least one setting agent and at least one texture-modifying particulate ingredient; heating the fluid composition at a temperature and time sufficient for pasteurization; and allowing the fluid composition to cool to form a non-baked foodstuff having at least 5% weight fraction of particulate matter having a particle size of about at least 100 μm, a liquid weight fraction of about at least 35%, and a gel strength of greater than 100.

The invention is further described by the following examples. It should be recognized that variations based on the inventive features are within the skill of the ordinary artisan, and that the scope of the invention should not be limited by the examples. To properly determine the scope of the invention, an interested party should consider the claims herein, and any equivalent thereof. In addition, all citations herein are incorporated by reference, and unless otherwise expressly stated, all percentages are by weight.

Example 1—Control Sample

This example describes the preparation of a control sample of a non-baked foodstuff prepared without a texture modifying ingredient. This method yielded a smooth chocolate fudge like texture snack suitable for long-term storage.

A dry blend was prepared including 24 g of gelatin (240 bloom), 2.4 g of sodium stearoyl lactylate, 180 g of sugar, 120 g of cocoa powder, and 6 g of modified starch (REZ-ISTA, Tate and Lyle, London, England). Water, 575.3 g, was placed into a THERMOMIX blending and heating device (Vorwerk, Longwood, Fla.). The dry blend and 112 g of liquid corn syrup were added to the THERMOMIX and mixed well. The mixture was heated to about 160° F., and 180 g of melted hydrogenated coconut and palm kernel oil was added (NEUTRESCA 77-25, Aarhus Karlsham USA Inc., Malmo, Sweden). The preparation was mixed and heated to 190° F., and held at 190° F. for about 3 minutes for pasteurization. The hot pasteurized mix was placed into 8 oz. containers, and covers were placed on the containers. The samples were cooled and kept under refrigeration.

Example 2—Chocolate Brownie-Like Non-Baked Foodstuff

This example illustrates the preparation of a non-baked foodstuff having a chocolate brownie like texture. The procedure and formulation are similar to the control sample. However, six weight percentages of Post GRAPE-NUTS cereal was added as a texture modifying ingredient. The resulting sample had a textural attribute similar to a brownie or a baked cake, and was more dense in texture than the control in the Example 1.

A dry blend was prepared including 24 g of gelatin (240 bloom), 2.4 g of sodium stearoyl lactylate, 180 g of sugar and 120 g of cocoa powder. Water, 593.9 g, was placed into a THERMOMIX blending and heating device. The dry blend, 27.7 g of liquid corn syrup, and 72 g of Post GRAPE-NUTS cereal were added to the THERMOMIX and mixed well. The mixture was heated to about 160° F., and 180 g of melted hydrogenated coconut and palm kernel oil (NEUTRESCA 77-25) was added to the mixture. The preparation was mixed and heated to 190° F., and held at 190° F. for about 3 minutes for pasteurization. The hot pasteurized mix was placed into 8 oz. containers, and covers were placed on the containers. The samples were cooled and kept under refrigeration.

Example 3—Non-Baked Cake Like Foodstuff

This example illustrates the preparation of a non-baked foodstuff having a cake-like texture. The procedure and formulation are similar to those for the control sample. However, nine weight percentages of Japanese bread crumbs (B#66140, Newly Weds Foods Inc., Chicago, Ill.) was added as a texture modifying ingredient. The resulting sample has a textural attribute similar to a baked cake.

A dry blend was prepared including 24 g of gelatin (240 bloom), 2.4 g of sodium stearoyl lactylate, 180 g of sugar, 36 g of maltodextrin (STAR-DRI 100), 24 g of modified starch (REZISTA), and 87.6 g of corn syrup solids (STAR-DRI 240). Water, 600 g, was placed into a THERMOMIX blending and heating device. The dry blend and 90 g of Japanese bread crumbs were added to the THERMOMIX and mixed well. The mixture was heated to about 160° F., and 144 g of melted hydrogenated coconut and palm kernel oil (NEUTRESCA 77-25) was added to the mixture. The preparation was mixed and heated to 190° F., and held at 190° F. for about 3 minutes for pasteurization. The hot mixture was placed into a HOBART bowl and cooled to about 120° F. The mixture was whipped at setting #2 for 5 minutes. The whipped mix was placed into 8 oz. containers and covers were placed on the containers. The samples were cooled and kept under refrigeration.

Example 4—Non-Baked Cake-Like Foodstuff Prepared with UHT Processing

This example illustrates the preparation of a non-baked foodstuff having cake like texture, prepared with a UHT processing step. This formulation and procedure were manufactured in a pilot plant setting. The procedure is similar to Example 4 except six percent by weight Dry Japanese Bread Crumbs were added to the mixture as a texture modifying ingredient. The resultant samples have a cake like texture.

Hot water (145f), 210 pounds, was batched with 0.84 pounds of sodium stearoyl lactylate, 8.4 pounds of gelatin (240 bloom), 42 pounds of cocoa powder, 7.56 pounds of corn syrup solids (STAR-DRI 240), 63 pounds of sugar, and 63 pounds of melted coconut palm kernel oil (NEUTRESCA 77-25). The mixture was homogenized in 2 stages at 500/2500 psi and collected. The mixture was then pumped into a mixing chamber at 7.5 pounds/min. Dry Japanese bread crumbs were added to the chamber at 0.53 pounds/min or at 6% of the mixture. The combined product was pumped out of the mixing chamber, heated to 285° F. through scraped surface heat exchangers, held for 2 seconds, and then cooled to 110° F. through scraped surface heat exchangers. The product was collected into cups, sealed, and refrigerated.

Example 5—Particulate Fraction Measurement

In one aspect, the particulate fraction of a foodstuff prepared as disclosed herein was measured by placing 100 g of foodstuff sample into a 600 ml glass beaker with 400 g of hot water (at about 140° F.). The beaker was placed on a heated stir plate with a 2" long stir bar (2" long), stirring at about 300 rpm, at 140° F. After 10 minutes, the hot sample was poured through a stack of two sieves with US sieve #18 on top and US sieve #140 at the bottom. Particulates were rinsed with running hot tap water until all solution was removed. The particulate fraction was obtained from both sieves and blotted dry with a paper towel. The samples made according to the disclosure herein contained at least 1% of weight fraction as particulate fraction (i.e., particle size greater than 0.1 mm) and preferably greater than 5%.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

The term "about" as used herein refers to a value that is +/− 10% of the value to which it refers, unless otherwise defined in any particular embodiment or example. By way of a non-limiting example, the term "about 50% water" refers to an amount of water ranging from 45% to 55%.

It is to be understood that at least some of the descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

We claim:

1. A method for preparing a multi-texture, non-baked foodstuff comprising a baked goods-like texture selected from the group consisting of a cake texture and a brownie texture, the method comprising:
    (a) preparing a first component with a first soluble solids ratio;
    (b) preparing a second component with a second soluble solids ratio, comprising at least one setting agent, an emulsified fat, and texture-modifying particulate ingredients, wherein the texture-modifying particulate ingredients are agglomerated and wherein the second component is non-baked having at least a 1% weight fraction of particulate matter having a particle size of about 100 μm to about 1000 μm and derived from the agglomerated texture-modifying particulate ingredients; and
    (c) combining the first and second components to form the multi-texture, non-baked foodstuff;
    wherein the second component does not comprise lecithin and further comprises at least 40% water and about 5% to about 40% fat, wherein the emulsified fat comprises one or more of canola oil, cocoa butter, coconut oil, copra oil, corn oil, olive oil, palm oil, palm kernel oil, peanut oil, safflower oil, soybean oil, and sunflower oil;
    wherein preparing the second component comprises:
        a) blending the at least one setting agent, the texture-modifying particulate ingredients, and water to form a fluid composition,
        b) adding the fat to the fluid composition to form a preparation, and
        c) mixing the preparation to form an emulsion.

2. The method of claim 1, wherein the first and second soluble solid ratios have a relative difference of about 12 percent or less.

3. The method for preparing a multi-texture, non-baked foodstuff of claim 1, wherein the agglomerated texture-modifying particulate ingredients maintain at least 90% of agglomeration from start to finish of preparing the second component.

4. A multi-texture, non-baked foodstuff comprising a baked goods-like texture selected from the group consisting of a cake texture and a brownie texture, the foodstuff comprising:
    (a) a first component with a first soluble solids ratio; and
    (b) a second component with a second soluble solids ratio, comprising at least one setting agent, an emulsified fat, and texture-modifying particulate ingredients, wherein the second component is non-baked having at least a 1% weight fraction of particulate matter having a particle size of about 100 μm to about 1000 μm and derived from the texture modifying particulate ingredients;
    wherein the second component does not comprise lecithin and further comprises at least 40% water and about 5% to about 40% fat, wherein the emulsified fat comprises one or more of canola oil, cocoa butter, coconut oil, copra oil, corn oil, olive oil, palm oil, palm kernel oil, peanut oil, safflower oil, soybean oil, and sunflower oil;
    wherein the texture-modifying particulate ingredients are agglomerated.

5. The foodstuff of claim 4, wherein the first and second soluble solids ratios have a relative difference of about 12 percent or less.

6. The foodstuff of claim 5, wherein the first and second components are arranged in discrete layers to form the multi-texture, non-baked foodstuff.

* * * * *